US008001269B1

(12) United States Patent
Satapati et al.

(10) Patent No.: US 8,001,269 B1
(45) Date of Patent: Aug. 16, 2011

(54) NETWORK ADDRESS TRANSLATION WITH IP REDUNDANCY

(75) Inventors: Suresh Satapati, Santa Clara, CA (US); Siva Jayasenan, Cupertino, CA (US); Ian Herbert Wilson, Edinburgh (GB); Mark A. Denny, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 824 days.

(21) Appl. No.: 10/174,730

(22) Filed: Jun. 18, 2002

(51) Int. Cl.
*G06F 15/16* (2006.01)
(52) U.S. Cl. ........................................ 709/245
(58) Field of Classification Search .................. 370/389; 709/245, 238, 249–250
See application file for complete search history.

(56) References Cited

U.S. PATENT DOCUMENTS

| | | | | |
|---|---|---|---|---|
| 5,473,599 | A * | 12/1995 | Li et al. | 370/219 |
| 6,148,410 | A * | 11/2000 | Baskey et al. | 714/4 |
| 6,195,705 | B1 * | 2/2001 | Leung | 709/245 |
| 6,301,223 | B1 * | 10/2001 | Hrastar et al. | 370/227 |
| 6,331,984 | B1 * | 12/2001 | Luciani | 370/401 |
| 6,556,547 | B1 * | 4/2003 | Srikanth et al. | 370/317 |
| 6,822,955 | B1 * | 11/2004 | Brothers et al. | 370/389 |
| 6,910,148 | B1 * | 6/2005 | Ho et al. | 714/4 |
| 7,881,208 | B1 * | 2/2011 | Nosella et al. | 370/242 |
| 2001/0048661 | A1 * | 12/2001 | Clear et al. | 370/218 |
| 2002/0156612 | A1 * | 10/2002 | Schulter et al. | 703/23 |

OTHER PUBLICATIONS

Tim Boyles and David Hucaby, CCNP Switching Exam Certification Guide. Dec. 20, 2000, Chapter 9—"Overview of Hot Standby Router Protocol".*
K. Egevang, et. al., "The IP Network Address Translator (NAT)", May 1994, Network Working Group, RFC 1631, 9 pages.*
Y. Rekhter, et al., "Address Allocation for Private Internets", Feb. 1996, Network Working Group, RFC 1918, 8 pages.*
T. Li, et al., "Cisco Hot Standby Router Protocol (HSRP)", Mar. 1998, Network Working Group, RFC 2281, 15 pages.*
James O' Toole, Jr., "Methods and Apparatus for Redirecting Traffic in the Presence of Network Address Translation," U.S. Appl. No. 10/100,771, filed Mar. 19, 2001, 60 Pages.

* cited by examiner

*Primary Examiner* — Kevin Bates
*Assistant Examiner* — Oleg Survillo
(74) *Attorney, Agent, or Firm* — Weaver Austin Villeneuve & Sampson LLP

(57) ABSTRACT

Redundant gateway methods, apparatus and systems using more than one gateway device in a gateway device group for communications directed outside of a LAN. Failover services are thus provided in the event that an active router or other gateway device fails. Network address translation (NAT) services are provided simultaneously by having all gateway devices in the redundancy group create and maintain IP aliases and static NAT mappings, while disabling all gateway devices operating in a non-active mode from replying to address resolution protocol requests from hosts. A gateway device may be configured to operate in a redundancy group in an active operating mode or a non-active operating mode. The gateway device handles transmissions into and out of the network to which it is connected only when the gateway device is in the active operating mode so as to avoid system corruption due to ARP activity and message transmissions by non-active gateway devices.

45 Claims, 5 Drawing Sheets

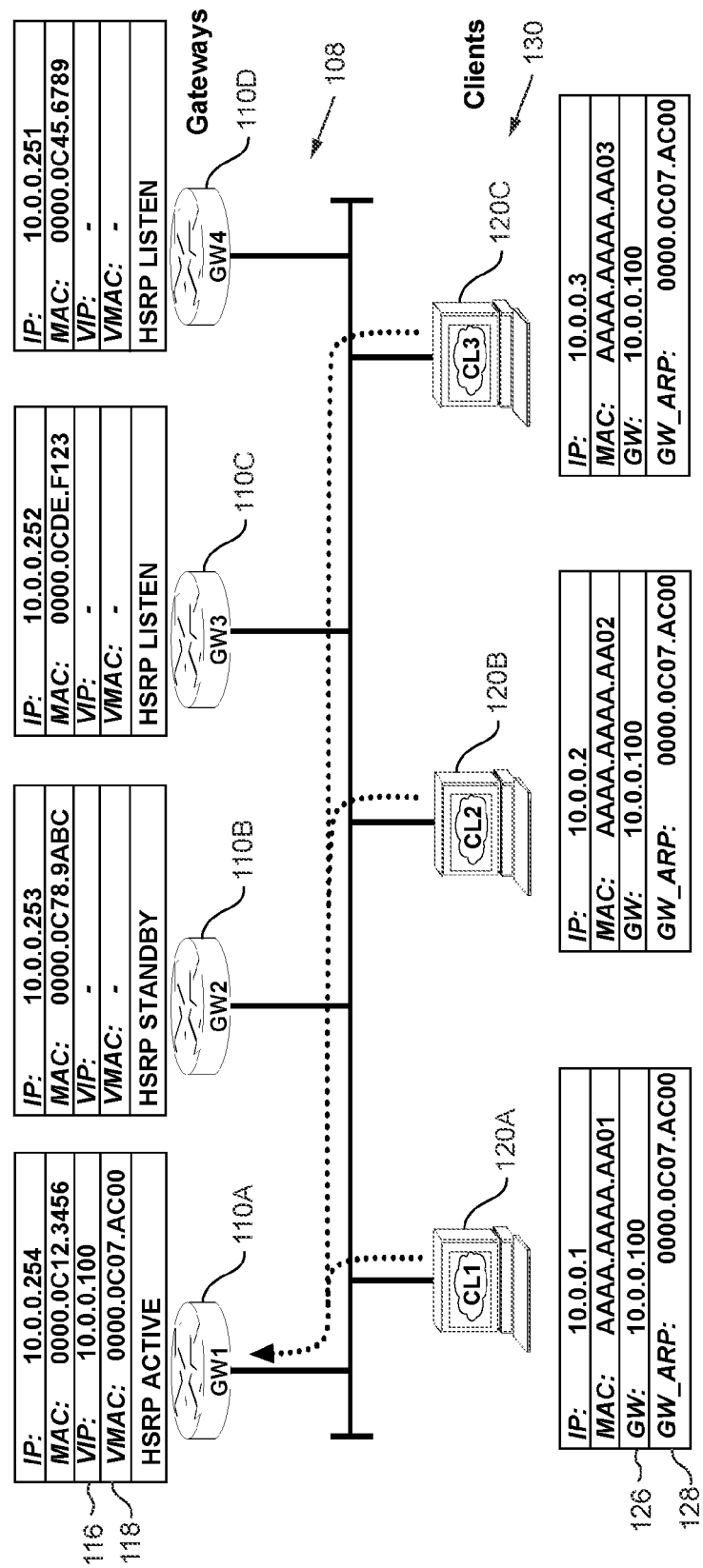
Figure 1A. HSRP with 4 participating routers in Normal mode
*PRIOR ART*

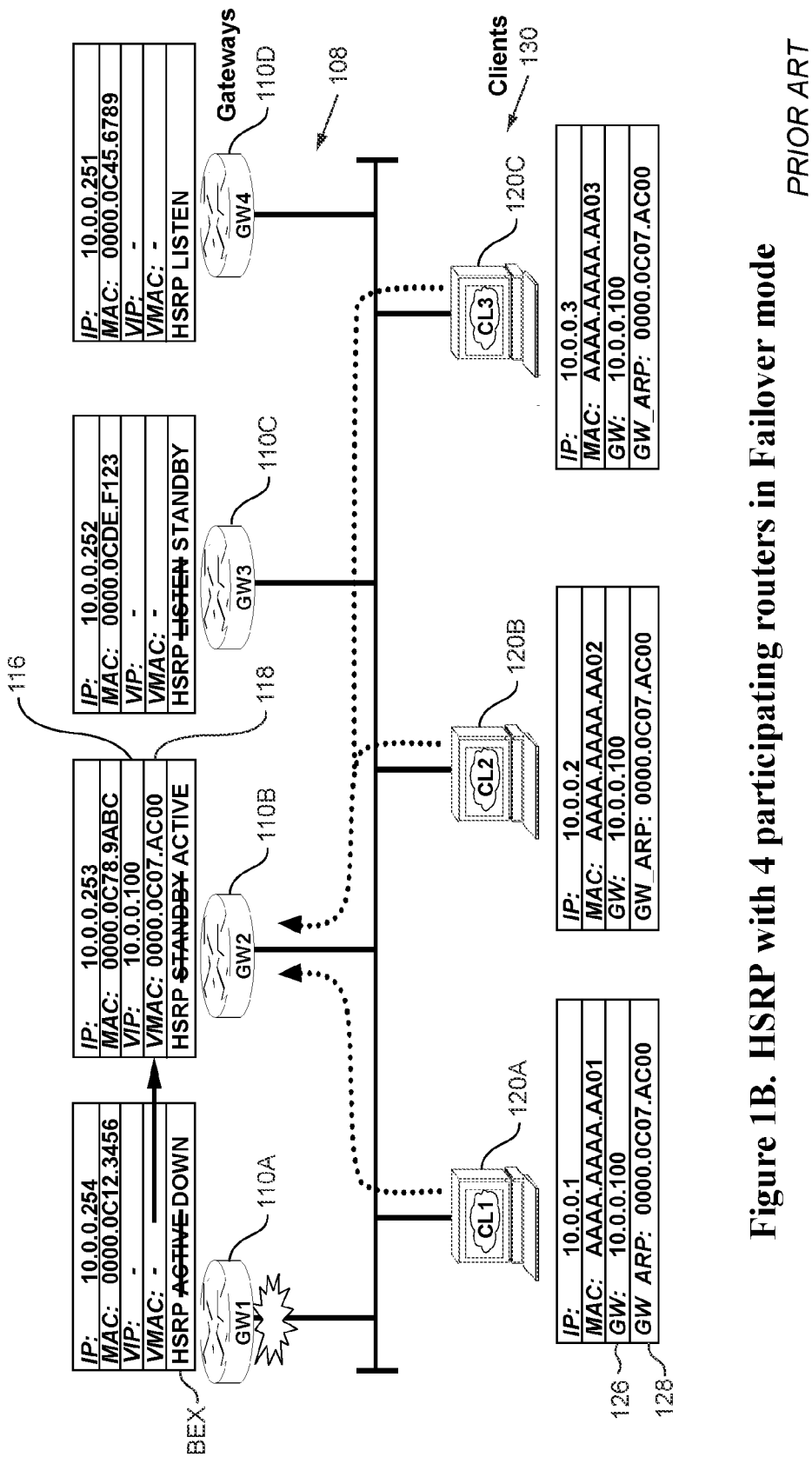
Figure 1B. HSRP with 4 participating routers in Failover mode
PRIOR ART

NETWORK ADDRESS TRANSLATION WITH IP REDUNDANCY

BACKGROUND OF THE INVENTION

The present invention relates generally to network systems using redundant or standby devices working together in a redundancy group to provide a virtual router service. More particularly, the present invention relates to methods and apparatus for providing network address translation services while allowing the forwarding of packets using virtual router service.

Private networks are commonly connected to the Internet through one or more gateway devices (for example, routers) so that hosts (PCs or other arbitrary network entities) on the private network can communicate with nodes on the Internet. Typically, the host will send packets to locations identified using an address (for example, an Internet Protocol or "IP" address) both within its private network and on the Internet. To receive packets from the Internet, a private network or a host on that network must have a globally unique address. Typically, each such address uses a four octet format to generate a 32-bit IP address. These IP addresses often are presented in a dotted decimal format, with each octet written as a decimal integer separated from other octets by decimal points.

Global IP addresses have been issued to enterprises by a central authority known as the Internet Assigned Number Authority ("IANA"). The LANA has issued such addresses in one of three commonly used classes. Class A IP addresses employ their first octet as a "netid" and their remaining three octets as a "hostid." The netid identifies the enterprise network and the hostid identifies a particular host on that network. As three octets are available for specifying a host, an enterprise having class A addresses has $2^{24}$ (nearly 17 million) addresses at its disposal for use with possible hosts. Thus, even the largest companies vastly underuse available class A addresses. Not surprisingly, Class A addresses are issued to only very large entities. Class B addresses employ their first two octets to identify a network (the netid) and their second two octets to identify a host (the hostid). Thus, an enterprise having class B addresses can use those addresses on approximately 64,000 hosts. Finally, class C addresses employ their first three octets as a netid and their last octet as a hostid. Only 254 host addresses are available to enterprises having a single class C netid.

There has been a substantial proliferation of hosts on the Internet, coupled with so many class A and B licenses issued to large entities, that it is now nearly impossible to obtain a class B address. Many organizations now requiring Internet access have far more than 254 hosts—for which unique IP addresses are available with a single class C network address. It is more common for a mid to large size enterprise to have 1,000 to 10,000 hosts. Such companies simply can not obtain enough IP addresses for each of their hosts.

To address this problem, a Network Address Translation ("NAT") protocol has been developed. See K. Egevang and P. Francis, "The IP Network Address Translator (NAT)," Request For Comments "RFC" 1631, Cray Communications, NTT, May 1994 which is incorporated herein by reference for all purposes. NAT is based on the concept of address reuse by and within private networks, and operates by mapping reusable or private IP addresses (see, RFC 1918, referenced and incorporated below) of a leaf or stub domain to globally unique addresses which are required for communication with hosts on the Internet. In implementation, a local host wishing to access the Internet receives a temporary IP address from a pool of such addresses available to the enterprise (for example, 254 class C addresses). While the host is sending and receiving packets on the Internet, it has a global IP address which is unavailable to any other host. After the host disconnects from the Internet, the enterprise can take back the global IP address and make it available to other hosts wishing to access public networks or the Internet. Through static NAT mappings, global IP addresses can be assigned to hosts using private IP addresses on a permanent basis so that, for example, parties attempting to reach the local hosts from outside a private network do not have to know the local IP addresses. These static mappings can be maintained by routers or other gateway devices that separate the private network from a public network like the Internet. To implement a NAT, a translation system must be provided between the enterprise private network and the Internet (or other public network). This means that NAT services, including static NAT mappings, are implemented at gateway positions.

As noted above, local area networks (LANs) are commonly connected with one another through one or more routers so that a host (a PC or other arbitrary LAN entity) on one LAN can communicate with other hosts on different LANs. Typically, the host is able to communicate directly only with the entities on its local LAN segment. When it receives a request to send a data packet to an address that it does not recognize as being local, it communicates through a router (or other layer-3 or gateway device) which determines how to direct the packet between the host and the destination address in a remote network. Unfortunately, a router may, for a variety of reasons, become inoperative (e.g., a power failure, rebooting, scheduled maintenance, etc.) creating a trigger event. Such potential router failure has led to the development and use of redundant systems, which have more than one router to provide a back up in the event of primary router failure. When a router fails, the host communicating through the inoperative router may still remain connected to other LANs if it can send packets to another router connected to its LAN.

Various protocols have been devised to allow a host to choose a router from among a group of routers in a network. Two of these, Routing Information Protocol (or RIP) and ICMP Router Discovery Protocol (IRDP) are examples of protocols that involve dynamic participation by the host. However, because both RIP and IRDP require that the host be dynamically involved in the router selection, performance may be reduced and special host modifications and management may be required.

In a widely used and somewhat simpler approach, the host recognizes only a single "default" router. In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host cannot send packets outside of its LAN. This may be true even though there may be a redundant router able to take over, because the host does not know about the backup. Unfortunately, such systems have been used in mission critical applications such as stock trading.

The shortcomings of these early systems led to the development and implementation of redundant gateway systems, which provide for potential failovers in gateway settings. One such system is the hot standby router protocol (HSRP) by Cisco Systems, Inc. of San Jose, Calif. A more detailed discussion of the earlier systems and of an HSRP type of system can be found in U.S. Pat. No. 5,473,599 (referred to herein as "the '599 Patent"), entitled STANDBY ROUTER PROTOCOL, issued Dec. 5, 1995 to Cisco Systems, Inc., which is incorporated herein by reference in its entirety for all purposes. Also, HSRP is described in detail in RFC 2281, entitled "Cisco Hot Standby Router Protocol (HSRP)", by T. Li, B. Cole, P. Morton and D. Li, which is incorporated herein by reference in its entirety for all purposes.

HSRP is widely used to back up primary routers for a network segment. In HSRP, a "standby" router is designated as the back-up to an "active" router. The standby router is linked to the network segment or segments serviced by the active router. The active and standby routers share a "virtual IP address" and possibly a "virtual Media Access Control (MAC) address" which is actually in use by only one router at a time. All internet communication from the relevant private network employs the virtual IP and MAC addresses. At any given time, the active router is the only router adopting and using the virtual addresses. Then, if the active router should cease operation for any reason, the standby router immediately takes over its load (by adopting the virtual addresses). This allows the host to always direct data packets to an operational router without monitoring the routers of the network.

A Cisco HSRP system is shown in FIGS. 1A and 1B. As seen in FIG. 1A, four gateways 110A-D (for example, routers) operate in a normal mode, providing redundant default gateway services in an active/standby configuration for a common IP subnet. In FIG. 1A, the multiple routers 110 (layer-3 switches) form a redundancy group 108 (RG) and share a virtual MAC address 118 and a virtual LP address 116. Hosts 120A-C on a common subnet 130 set their default gateway IP address 126 and MAC address 128 to the virtual addresses 116, 118 within RG 108 for their subnet. In an RG 108 of a prior HSRP system, an "active" RG member 110A (for example, an "Active HSRP enabled router") is elected based on pre-configured priorities or other suitable criteria and/or methodologies.

The active router 110A of the RG 108 responds to all address resolution protocol ("ARP") requests (or any similar or analogous mechanisms used by the router for providing address information to requesting parties) for the virtual IP address 116, thus providing default gateway services for all hosts 120 of the common subnet 130 during normal operation. During normal operation, a secondary RG member 110B of the RG 108 remains in a "standby" mode. If the primary member 110A of the RG 108 should fail, as shown in FIG. 1B, the standby router 110B will assume the virtual MAC and IP addresses 118, 116, effectively becoming the primary member (or "active router") and thereby providing uninterrupted gateway services to the hosts 120 of common subnet 130 without the need for additional ARP discovery/resolution. This configuration provides a reliable fail-over function for the gateway devices.

The collocation of HSRP routers (or other redundancy group gateway devices) and NAT services can lead to problems. When IP redundancy (for example, HSRP) is configured on NAT-enabled interfaces on two or more routers that have the same set of static mappings configured, external users accessing the private network may end up routing traffic through, and thereby traffic being translated on, a non-active redundancy group router. This is due to all routers participating in the redundancy group responding to ARP requests from end-point devices, using each router's own BIA MAC address. Such behavior is not effective for supporting a high-availability routing environment in which only the active router or gateway device is supposed to route traffic.

In view of the foregoing, it would be desirable to provide NAT services for communications from outside a private network while ensuring that redundant gateway services are still available for the private network.

SUMMARY OF THE INVENTION

The present invention relates to redundant gateway methods, apparatus and systems using more than one gateway device in a gateway device group for communications directed outside of a LAN. Failover services are thus provided in the event that an active router or other gateway device fails. Network address translation (NAT) services are provided simultaneously by having all gateway devices in the redundancy group create and maintain IP aliases and static NAT mappings, while disabling all gateway devices operating in a non-active mode from replying to address resolution protocol requests from hosts. A gateway device according to one embodiment of the present invention is configured to operate in a redundancy group in an active operating mode or a non-active operating mode. The gateway device handles transmissions into and out of the network to which it is connected only when the gateway device is in the active operating mode.

In other embodiments of the present invention, ARP entries are only installed and maintained by the gateway device when it is operating in the active operating mode. When the gateway device changes operating modes from active to non-active, the ARP entries are removed. When the gateway device is operating in a non-active operating mode and changes to the active operating mode, ARP entries are installed and a gratuitous ARP message is issued by the gateway device to any translated addresses. The redundancy group can be an HSRP group, a VRRP group, or some other another group corresponding to another redundancy protocol.

In a different embodiment of the present invention, a method of simultaneously providing redundancy gateway services and network address translation (NAT) services using a gateway device having an active operating mode, wherein the gateway device handles transmissions into and out of a first network only when the gateway device operates in the active operating mode, includes implementing a NAT functionality in the gateway device, wherein the NAT functionality comprises an ARP functionality and disabling the ARP functionality when the gateway device is not in the active operating mode. The NAT functionality in the gateway device can include installing IP aliases in the gateway device, installing NAT mappings in the gateway device, and enabling the ARP functionality. In turn, the ARP functionality can include replying to ARP requests for translated addresses and/or installing ARP entries for translated addresses.

In another embodiment of the present invention, the gateway device can detect a change in the operating mode of the gateway device from the active operating mode to a non-active operating mode and, in response, remove any ARP entries in the gateway device. Further, the gateway device can detect a change in the operating mode of the gateway device from a non-active operating mode to the active operating mode and respond by installing ARP entries in the gateway device and/or issuing a gratuitous ARP message to any translated addresses handled by the gateway device.

Cisco's HSRP can be used to provide redundancy gateway services, in which case the active operating mode of the gateway device may be the HSRP Active state. VRRP also may be used to provide redundancy gateway services. In any of these embodiments, the gateway device can be a router or other appropriate device.

In one other embodiment of the present invention, a redundancy gateway apparatus includes memory means and processor means coupled to one another. The memory means and the processor means are configured to operate the gateway device in a redundancy group in an active operating mode or a non-active operating mode. The gateway device apparatus handles transmissions into and out of a first network only when the gateway device operates in the active operating mode and replies to ARP requests only when the gateway device operates in the active operating mode.

Another aspect of the invention pertains to computer program products including a computer usable medium having computer readable code embodied therein on which is stored computer code (such as program instructions) for implementing at least some portion of the methods described above. Any of the methods of this invention may be represented, in whole or in part, as program instructions that can be provided on such computer readable media. In addition, the invention pertains to various combinations of data and data structures generated and/or used as described herein. The steps provided may be considered in the sequence presented or in other appropriate sequences as would be apparent to one skilled in the art.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which:

FIG. 1A is a schematic diagram of an HSRP gateway service for hosts in a LAN.

FIG. 1B is a schematic diagram of an HSRP gateway service for hosts in a LAN showing a failover mode when one of the gateway devices fails.

DETAILED DESCRIPTION OF THE EMBODIMENTS

1. Definitions

Figure 2:
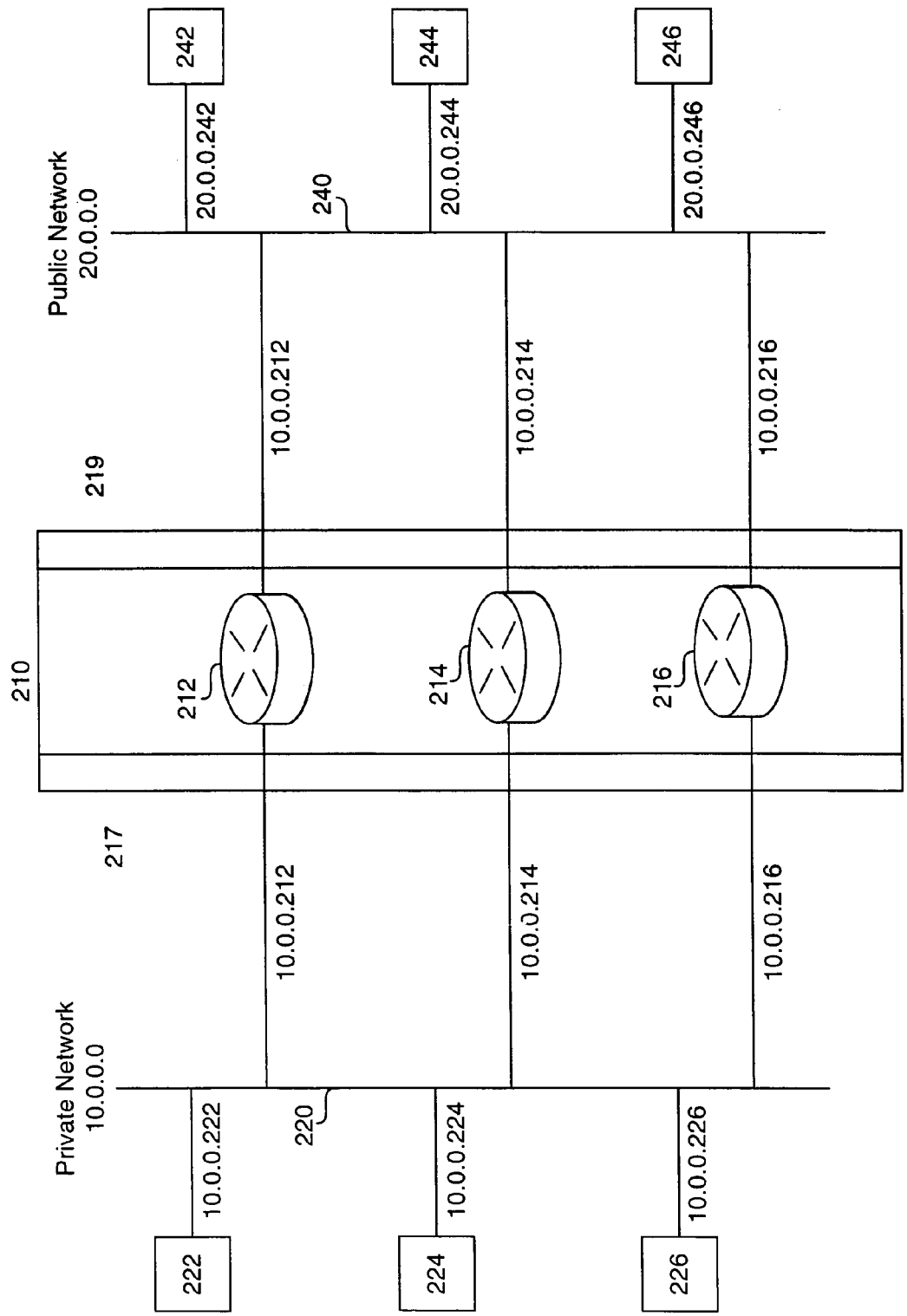
FIG. 2 is a schematic diagram of a virtual router in which several routers are available to direct traffic from Network A to Network B and in which the routers are configured to implement the present invention.

Reference will now be made in detail to the preferred embodiment of the invention. An example of the preferred embodiment utilizing products, protocols, methods, systems and other technology developed, sold and/or used by Cisco Systems is illustrated in the accompanying drawings. While the invention will be described in conjunction with that preferred embodiment, it will be understood that it is not intended to limit the invention to one preferred embodiment or to its implementation solely in connection with Cisco products and systems. On the contrary, the following description is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following terms are used in the instant specification. Their definitions are provided to assist in understanding the preferred embodiments described herein, but do not necessarily limit the scope of the invention.

A "host" is a PC, or other arbitrary network entity residing on a LAN, that periodically communicates with network entities outside the LAN on which the host resides through a router or bridge. The term "user" may be used equivalently in this disclosure.

A "router" is a piece of hardware which operates at the network layer to direct packets between various LANs or WANs of a network. The network layer generally allows pairs of entities in a network to communicate with each other by finding a path through a series of connected nodes. Other terms that may be used in this disclosure include layer 3 switch, layer 3 device and gateway or gateway device which are not necessarily the same as a router, but which may function in the same place and manner as a router. Any and all of these terms are intended to be interpreted as broadly as possible, unless specifically defined more narrowly.

An "IP (internet protocol) address" is a network layer address for a device operating in the IP suite of protocols. The IP address is typically a 32 bit field, at least a portion of which contains information corresponding to its particular network segment. Thus, the IP address of a router may change depending upon its location in a network.

A "MAC address" is a data link layer device address, defined by the IEEE 802 committee that deals with issues specific to a particular type of LAN. The types of LANs for which MAC (an acronym for Media Access Control) addresses are available include token ring, FDDI and Ethernet. A MAC address generally is intended to apply to a specific physical device no matter where it is plugged into the network. Thus, a MAC address generally is hardcoded into the device—on a router's ROM, for example. This should be distinguished from the case of a network layer address, described above, which changes depending upon where it is plugged into the network. Also, a real MAC address (such as a "burned in address" or BIA MAC address) can be distinguished from a "virtual address" (as defined below) which can include a virtual MAC address.

A "virtual address" is an address, typically shared by a group of real network entities, corresponding to a virtual entity. In the context of this invention, one real router from among two or more real routers emulates a virtual router by adopting the virtual address, and another entity (usually a host) is configured to send data packets to such virtual address, regardless of which real router is currently emulating the virtual router. In the preferred embodiments, the virtual addresses may encompass both MAC layer and network layer (IP) addresses. Usually, various members of the group each have the capability of adopting the virtual address(es) to emulate a virtual entity.

A "packet" is a collection of data and control information including source and destination node addresses, formatted for transmission from one node to another. In the context of this invention, it is important to note that hosts on one LAN send packets to hosts on another LAN through a router or bridge connecting the LANs.

"IP aliases" are the addresses that belong to a device, including the addresses that are configured on the device's interfaces and any addresses not configured on the interfaces, but which are owned by the device.

2. Overview

Hosts in a private network (for example, workstations, users and/or data center servers) using the IP protocol must utilize a default gateway to exit a local private network and access remote networks, including public networks. Therefore, each private network host must have prior knowledge of the gateway's IP address which typically is a router or layer-3 switch IP address. Hosts are either statically configured with the IP address of the default gateway or are assigned the address through a configuration protocol (such as Cisco's DHCP) upon boot-up. In either case, the host uses the same default gateway IP address for all network traffic destined to exit the local private network.

As noted above, NAT can assist hosts in a private network in accessing public networks and, likewise, assist parties outside the private network to access hosts on the private network. FIG. 2 is a network diagram showing a private network connected to a public network by a redundancy group using NAT in accordance with the present invention. While FIG. 2 is greatly simplified for purposes of illustration, the examples presented in connection with FIG. 2 provide those skilled in the art with a knowledge of how the present invention is implemented and used. For example, the system illustrated in FIG. 2 will be explained using Cisco's HSRP redundant gateway system. Other IP redundancy schemes and/or protocols can utilize the present invention in analogous ways and such analogous implementations and uses will be apparent to those skilled in the art. Terminology used to describe one or more embodiments of the present invention is not limited to a single redundancy system. For example, a router that is said to be in an "active operating mode" or the like is meant to be a router or other gateway device that is responsible for transmissions into and out of a given network, such as a private network. A router in such an active operating mode might be an Active HSRP router, a Primary VRRP router, or some other analogous device. A router operating in a "non-active operating mode" might be an HSRP router (or other gateway device) in an HSRP Listen or Standby state, a Secondary VRRP router, or some other similar or analogous device.

In FIG. 2, a private network 220 (using address space 10.0.0.0) is connected to a public network 240 (using address space 20.0.0.0) by a virtual router 210. The virtual router 210 includes three "real" routers 212, 214, 216. Virtual router 210 is connected to private network 220 on interface 217 and to public network 240 on interface 219. In FIG. 2, the real routers 212, 214, 216 are configured to implement one embodiment of the present invention, as described herein.

Hosts 222, 224, 226 on private network 220 use the virtual router 210 as their gateway for communications outside the private network 220, including public network 240. Similarly, hosts 242, 244, 246 on public network 240 use virtual router 210 for communications with hosts on private network 220. For convenience, the IP addresses of the hosts on public network 240 correspond to the hosts' reference numerals, so that host 242 has IP address 20.0.0.242, host 244 has IP address 20.0.0.244, etc. Similarly, hosts on private network 220 have IP addresses corresponding to their reference numerals as well (for example, host 222 has IP address 10.0.0.222).

The IP addresses used within private network 220 are reusable, non-unique IP addresses, in accordance for example with RFC 1918, Y. Rekhter et al., "Address Allocation for Private Internets," Request For Comments "RFC" 1918, Cisco Systems et al., February 1996, which is incorporated herein by reference for all purposes. The IP addresses used by public network 240 are globally unique IP addresses, such as would be used on the Internet.

In FIG. 2, HSRP is configured on the NAT interface 217 on all three routers 212, 214, 216. The real MAC addresses of routers 212, 214, 216 on interface 219 are 00d0.bbd3.bc12, 00d0.bbd3.bc14 and 00d0.bbd3.bc16, respectively. The following NAT mappings are configured on all of the routers in group 210:

10.0.0.222 <-is-mapped-to> 20.0.0.222
10.0.0.224 <-is-mapped-to> 20.0.0.224
10.0.0.226 <-is-mapped-to> 20.0.0.226
20.0.0.242 <-is-mapped-to> 10.0.0.242
20.0.0.244 <-is-mapped-to>10.0.0.244
20.0.0.246 <-is-mapped-to> 10.0.0.246 which means that:

Host 222 is translated to 20.0.0.222 on public network 240
Host 224 is translated to 20.0.0.224 on public network 240
Host 226 is translated to 20.0.0.226 on public network 240
Host 242 is translated to 10.0.0.242 on private network 220
Host 244 is translated to 10.0.0.244 on private network 220
Host 246 is translated to 10.0.0.246 on private network 220

In earlier systems, when a host in a public network, for example host 244, ARPs for a host on private network 220, for example host 222, the ARPing host receives the MAC addresses for all of the routers serving in the HSRP group for the private network 220. Therefore, when host 244 ARPs for host 222, host 244 receives MAC addresses 00d0.bbd3.bc12, 00d0.bbd3.bc14 and 00d0.bbd3.bc16, respectively, from routers 212, 214, 216.

In HSRP, however, only one of the real routers is acting as the "Active" router and forwarding packets into and out of the private network 220. Here, if router 212 is the active HSRP router, then routers 214 and 216 should be in either "standby" or "listen" states, which means that these two routers should not be forwarding packets. However, in the example relating to earlier systems, above, when host 244 ARPs for host 222 and receives all three HSRP routers' MAC addresses, host 244 might cache the MAC address of one of the non-active routers.

In the preferred embodiment of the present invention, routers in a redundancy group that are not operating in an active (or analogous) mode are disabled from replying to ARP requests for the private network which they serve. Instead, only the router that is operating in active mode responds to ARP requests from outside entities, thus preserving the intended HSRP operational characteristics.

Therefore, using the system shown in FIG. 2 utilizing routers implementing one embodiment of the present invention, when host 244 ARPs for host 222, and the present invention is implemented, only router 212 (the HSRP active router) will respond with its BIA MAC address of 00d0.bbd3.bc12 for communications from host 244 intended for host 222.

In the preferred embodiment of the present invention, all of the routers in the HSRP maintain NAT translation tables (for example, static NAT mappings) irrespective of their HSRP operational mode and/or state. If router 212 initially is the active router and router 214 initially is the standby router and router 212 fails, then router 214 is promoted to active status and router 216 is promoted to standby status. Because all of the redundancy group gateway devices maintain their NAT tables, whichever router becomes the new active router will be able to continue providing translation services.

However, in the present invention, only the active router will create both the IP aliases and the ARP entry for those translation addresses. This will enable the active router to respond to ARP queries for any of the translated addresses from external hosts. In addition to the maintenance of the ARP entries by the active router alone, several additional measures are used in the preferred embodiment of the present invention to prevent problems.

When there is a state change on the HSRP active router from active to a non-active mode of operation (for example, standby or listen), the ARP entry that was previously created for translated addresses in the former active router is deleted. Any corresponding IP aliases in the NAT translation alias table remain untouched. At the same time, the former standby router moves from standby to active status and installs an ARP entry for the translated addresses (any IP aliases for these addresses were created during configuration of NAT mappings). In addition to the ARP entry adjustments by the former and new active routers, gratuitous ARP can be issued for the translated addresses to prevent ARP corruption at the endpoints. This gratuitous ARP will update host ARP caches that contain the no longer valid MAC address of the former active router. Those skilled in the art will appreciate that these measures will ensure that IP packets are routed by the HSRP active router and are translated on the HSRP active router according to the NAT mapping rules. Similar measures can be taken in other IP redundancy systems to achieve the same or similar results so that proper forwarding of packets by the redundancy group is not disrupted.

Figure 3:
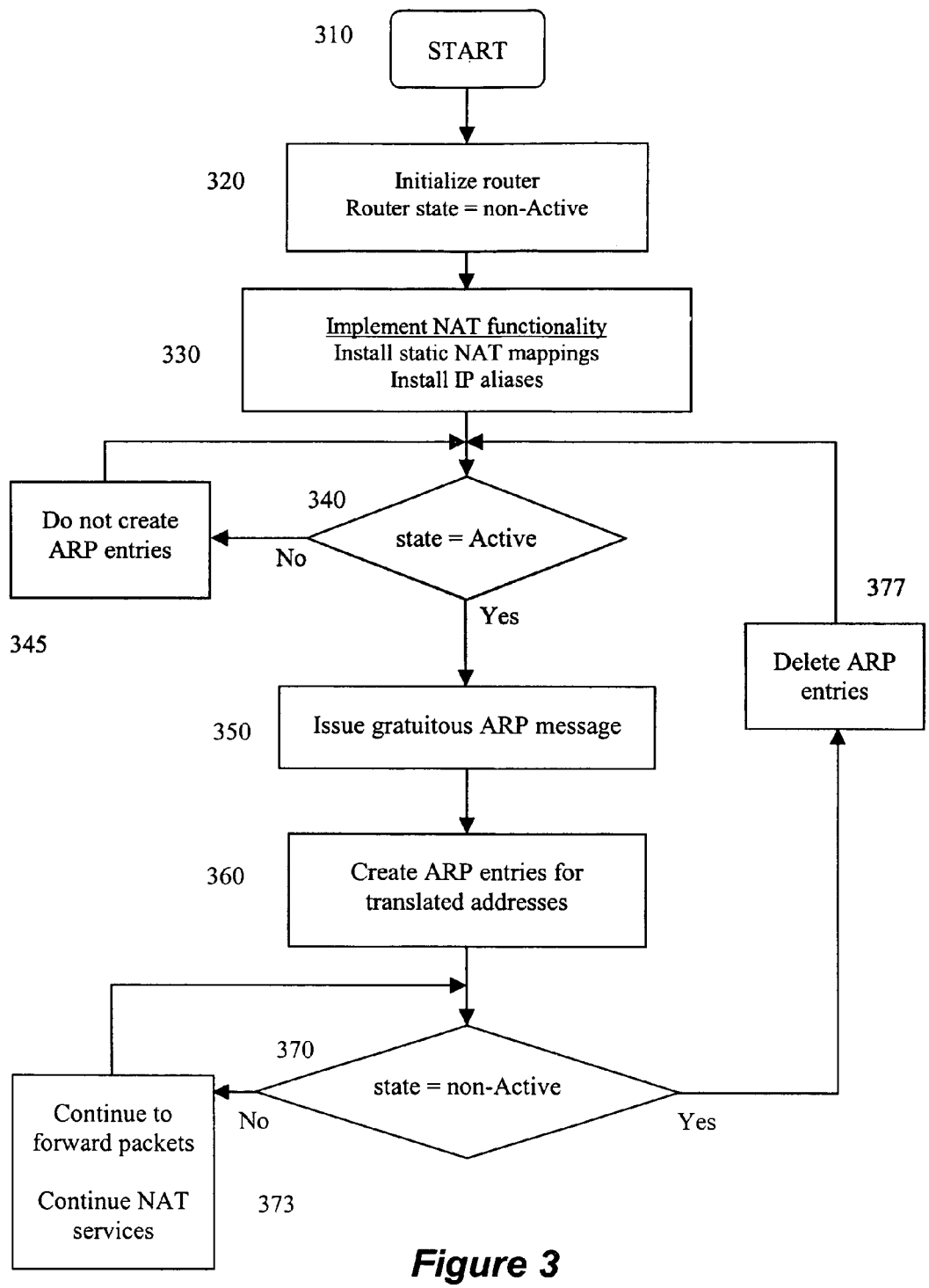
FIG. 3 is a flow diagram showing a methodology using one embodiment of the present invention.

As a further example, FIG. 3 is a flow diagram illustrating one embodiment of the present invention is provided. The flow diagram of FIG. 3 is organized in a manner that could imply that the system checks for certain actions by event loops or polling. No such limitation is intended. Thus, the process flow charts presented herein should not be read to imply that the system necessarily checks for events in the manner and order listed. While this example provides those skilled in the art with an understanding of one methodology of the present invention and an understanding of its use in other contexts, the example presented in FIG. 3 is not to be interpreted as being limited in any way. For example, routers are used as the gateway devices in this example but are not required. Moreover, HSRP is the IP redundancy system used in the example, but is not the only one in which the present invention could be used.

The method starts at step 310 and begins operation with initialization of the router and setting the router state to a non-active state at step 320. In this example, static NAT mappings are provided to the router so that IP aliases can be created at step 330. At step 340, the router checks its state (that is, its mode of operation) to determine whether or not it is in active mode. If it is not, then no ARP entries are created (step 345) for the translated addresses stored as IP aliases. If, however, the router is in active mode, it issues a gratuitous ARP message at step 350 so that endpoints have the active router's MAC address for packets destined for the private network served by the router and the redundancy group. In other embodiments, a gratuitous ARP message may not be sent when the active router boots up initially; it may only issue the gratuitous ARP after a state change from a non-active mode to active mode. At step 360, ARP entries corresponding to the IP aliases are created in the router's ARP table for the translated addresses.

The router again checks its state at step 370 to determine whether its state has changed from an active mode to a non-active mode. If the router is still the active router, then at step 373 it continues to function as an HSRP active router by forwarding packets and continuing to provide NAT services to external users seeking to communicate with one or more hosts on the private network. If the router's mode has changed from active to non-active, then it deletes the ARP entries in its ARP table and functions as a non-active HSRP router. The non-active router can check its status again at step 340 from time to time to determine whether it has again been elected to active status. If a non-active router changes state from non-active (for example, standby state in HSRP) to active status at step 340, then a gratuitous ARP message is sent at step 350 to notify endpoint users of the new router's identity.

More specific details follow regarding the functionality and implementation of one embodiment of the present invention in connection with Cisco's HSRP system. As will be appreciated by one skilled in the art, IP Redundancy (for example, Cisco's HSRP+functionality) can be used to add or remove IP aliases corresponding to the NATed addresses. In the present invention, ARP entries for these addresses can be installed or removed in a given router depending upon the HSRP state (for example, active or non-active) of the router's interfaces. The configuration for a given network then becomes:

Router 1
  ip nat inside source static 10.0.0.3 20.0.0.3 redundancy HSRP1
  ip nat outside source static 20.0.0.13 10.0.0.13 redundancy HSRP1
  interface ethernet1
  ip address 10.0.0.1 255.255.255.0
    standby 1 ip 10.0.0.254
  standby 1 priority 105 preempt
  standby 1 track Ethernet2 10
  standby 1 name HSRP1
  ip nat inside
  interface ethernet2
  ip address 20.0.0.11 255.255.255.0
  ip nat outside
Router 2
  ip nat inside source static 10.0.0.3 20.0.0.3 redundancy HSRP1
  ip nat outside source static 20.0.0.13 10.0.0.13 redundancy HSRP1
  interface ethernet1
  ip address 10.0.0.2 255.255.255.0
  standby 1 ip 10.0.0.254
  standby 1 priority 100 preempt
  standby 1 name HSRP1
  ip nat inside
  interface ethernet2
  ip address 20.0.0.12 255.255.255.0
  ip nat outside
The command:
ip nat inside source static 10.0.0.3 20.0.0.3 redundancy HSRP1
  will result in a static IP address mapping <10.0.0.3, 20.0.0.3> to be installed in the router's NAT table, and subsequently in the creation of IP aliases for the translated address (that is, 20.0.0.3). If the router is in "Active" state for HSRP group "HSRP1", then an ARP entry for IP address 20.0.0.3 will be created as normal. Otherwise, an ARP entry will not be created.

If the router transitions from Active to non-Active state for a configured HSRP group, this will cause NAT to remove the ARP entries for any aliases that are dependant upon that HSRP group. The IP alias entries will remain. If the router transitions then from non-Active to Active state, this will cause NAT to delete and re-add the IP alias (thus re-adding it to the ARP table). NAT will also issue a gratuitous ARP in order to update endpoint ARP cache's.

Those skilled in the art will appreciate that the selection of a redundancy and/or NAT protocol for use in a given setting may be influenced by various considerations. Regardless of the protocol(s) selected, however, the present invention can be implemented in a virtual router group or other redundancy group by appropriate selection of the redundancy protocol and the NAT requirements of the system so that the desired performance can be obtained.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 4:
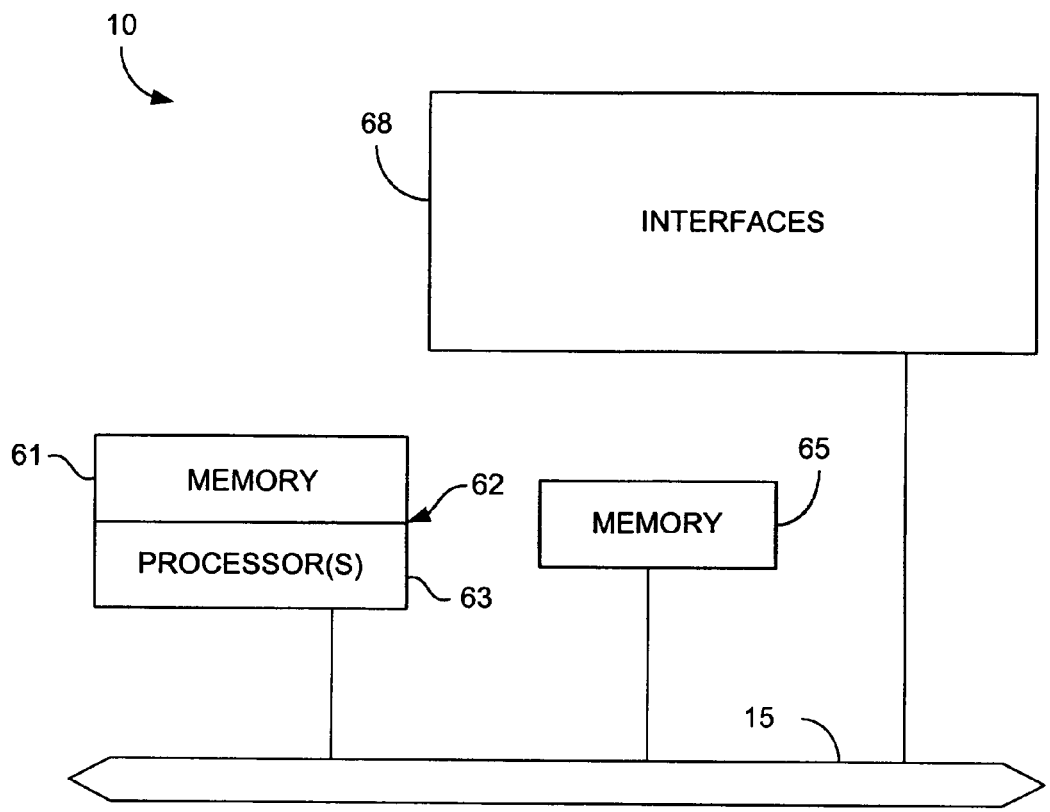
FIG. 4 is a diagrammatic representation of a router in which embodiments of the present invention may be implemented.

Referring now to FIG. 4, a router 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such router tasks as routing table computations and network management. It may also be responsible for calculating a route metric and/or comparing two route metrics to determine which has higher priority. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 4 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, one or more Translation Tables, NVI constructs, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of simultaneously providing redundancy gateway services and network address translation (NAT) services using a gateway device in a redundancy group, the gateway device having an active operating mode, wherein the gateway device handles transmissions into and out of a first network only when the gateway device operates in the active operating mode, the method comprising:
   implementing a NAT functionality in the gateway device for hosts on the first network, wherein the NAT functionality comprises maintaining NAT mappings and implementing an ARP functionality, wherein the NAT mappings map private Internet Protocol (IP) addresses to global IP addresses;

disabling the Address Resolution Protocol (ARP) functionality when the gateway device is not in the active operating mode, and wherein implementing the ARP functionality includes responding to ARP requests from external hosts for NAT translated addresses of the hosts on the first network by composing ARP replies and sending the ARP replies;

wherein the external hosts are not on the first network and wherein the gateway device is not one of the hosts on the first network.

2. The method of claim 1 wherein the step of implementing a NAT functionality in the gateway device comprises:
installing IP aliases in the gateway device;
installing the NAT mappings in the gateway device; and
enabling the ARP functionality.

3. The method of claim 1 wherein the ARP functionality comprises replying to ARP requests for translated addresses.

4. The method of claim 1 wherein the ARP functionality comprises installing ARP entries for translated addresses.

5. The method of claim 1 further comprising:
detecting a change in the operating mode of the gateway device from the active operating mode to a non-active operating mode; and
removing any ARP entries in the gateway device.

6. The method of claim 1 further comprising:
detecting a change in the operating mode of the gateway device from a non-active operating mode to the active operating mode; and
installing ARP entries in the gateway device.

7. The method of claim 1 further comprising:
detecting a change in the operating mode of the gateway device from a non-active operating mode to the active operating mode; and
the gateway device issuing a gratuitous ARP message to any translated addresses handled by the gateway device, wherein the gratuitous ARP message includes a Media Access Control (MAC) address of the gateway device.

8. The method of claim 1 wherein the gateway device uses Hot Standby Router Protocol (HSRP) to provide redundancy gateway services; and
further wherein the active operating mode of the gateway device is the HSRP Active state.

9. The method of claim 1 wherein the gateway device uses Virtual Router Redundancy Protocol (VRRP) to provide redundancy gateway services.

10. The method of claim 1 wherein the gateway device is a router.

11. A redundancy gateway device comprising:
a memory; and
a processor coupled to the memory;
wherein the memory and the processor are configured to operate the gateway device in a redundancy group in an operating mode selected from the following:
an active operating mode; and
a non-active operating mode;
wherein the gateway device handles transmissions into and out of a first network only when the gateway device operates in the active operating mode;
wherein the gateway device replies to Address Resolution Protocol (ARP) requests only when the gateway device operates in the active operating mode;
wherein the memory and the processor are further configured to maintain Network Address Translation (NAT) mappings for hosts on the first network, irrespective of the mode of operation of the gateway device, wherein the NAT mappings map private Internet Protocol (IP) addresses to global IP addresses; and wherein the memory and the processor are further configured to respond to ARP requests from external hosts for NAT translated addresses of the hosts on the first network by composing ARP replies and sending the ARP replies, wherein the external hosts are not on the first network and wherein the gateway device is not one of the hosts on the first network.

12. The redundancy gateway device of claim 11 wherein the memory and the processor are further configured to create and maintain ARP entries only when the gateway device operates in the active operating mode.

13. The redundancy gateway device of claim 11 wherein the memory and the processor are configured to change from active to non-active operating mode in preselected conditions; and
further wherein the memory and the processor are configured to remove any ARP entries in the gateway device when the gateway device changes from the active operating mode to the non-active operating mode.

14. The redundancy gateway device of claim 11 wherein the memory and the processor are configured to change from non-active to active operating mode in preselected conditions; and
further wherein the memory and the processor are configured to install ARP entries when the gateway device changes from non-active to active operating mode.

15. The redundancy gateway device of claim 11 wherein the memory and the processor are configured to change from non-active to active operating mode in preselected conditions; and
further wherein the memory and the processor are configured to issue a gratuitous ARP message to any translated addresses handled by the gateway device when the gateway device changes from non-active to active operating mode, wherein the gratuitous ARP message includes a Media Access Control (MAC) address of the gateway device.

16. The redundancy gateway device of claim 11 wherein the redundancy group is a Hot Standby Router Protocol (HSRP) redundancy group;
further wherein the active operating mode is the Active HSRP state; and
further wherein the non-active operating mode comprises the Standby HSRP state.

17. The redundancy gateway device of claim 11 wherein the redundancy group is a Virtual Router Redundancy Protocol (VRRP) redundancy group.

18. The redundancy gateway device of claim 11 wherein the memory and the processor utilize the NAT mappings in providing network address translation services.

19. The redundancy gateway device of claim 11 wherein the gateway device is a router.

20. The redundancy gateway device as recited in claim 11, wherein composing the ARP replies is performed using the NAT mappings.

21. The redundancy gateway device as recited in claim 20, wherein the memory and the processor are further configured to perform network address translation for transmissions between external hosts that are external to the first network and the hosts on the first network using the NAT mappings.

22. The redundancy gateway device as recited in claim 11, wherein the memory and the processor are further configured to perform network address translation for transmissions between external hosts that are external to the first network and the hosts on the first network using the NAT mappings.

23. The redundancy gateway device as recited in claim 11, wherein members of the redundancy group share a virtual IP address, wherein the memory and the processor are further configured to respond to ARP requests for the virtual IP address with an ARP reply including a Media Access Control (MAC) address of the gateway device.

24. The redundancy gateway device as recited in claim 11, wherein members of the redundancy group implement a redundancy protocol, wherein the redundancy protocol is not Hot Standby Router Protocol (HSRP).

25. The redundancy gateway device as recited in claim 24, wherein the redundancy protocol is Virtual Router Redundancy Protocol (VRRP).

26. The redundancy gateway device as recited in claim 11, wherein the NAT translated addresses of the hosts on the first network are global IP addresses.

27. A computer program product for implementing a method of simultaneously providing redundancy gateway services and network address translation (NAT) services using a gateway device having an active operating mode, wherein the gateway device handles transmissions into and out of a first network only when the gateway device operates in the active operating mode, the computer program product including a non-transitory computer usable medium having computer readable code embodied therein, the computer readable code comprising:
  computer code for implementing a NAT functionality in the gateway device for hosts on the first network, wherein the NAT functionality comprises performing network address translation using NAT mappings and an Address Resolution Protocol (ARP) functionality, wherein the NAT mappings map private Internet Protocol (IP) addresses to global IP addresses, thereby enabling the gateway device to handle transmissions between external hosts that are external to the first network and the hosts on the first network;
  computer code for disabling the ARP functionality when the gateway device is not in the active operating mode, and
  computer code for responding to ARP requests from external hosts for NAT translated addresses of the hosts on the first network by composing ARP replies and sending the ARP replies, wherein the external hosts are not on the first network and wherein the gateway device is not one of the hosts on the first network.

28. The computer program product of claim 27 wherein the computer code for implementing a NAT functionality in the gateway device comprises:
  computer code for installing IP aliases in the gateway device;
  computer code for installing the NAT mappings in the gateway device; and
  computer code for enabling the ARP functionality.

29. The computer program product of claim 27 wherein the ARP functionality comprises replying to ARP requests for translated addresses.

30. The computer program product of claim 27 wherein the ARP functionality comprises installing ARP entries for translated addresses.

31. The computer program product of claim 27 further comprising:
  computer code for detecting a change in the operating mode of the gateway device from the active operating mode to a non-active operating mode; and
  computer code for removing any ARP entries in the gateway device.

32. The computer program product of claim 27 further comprising:
  computer code for detecting a change in the operating mode of the gateway device from a non-active operating mode to the active operating mode; and
  computer code for installing ARP entries in the gateway device.

33. The computer program product of claim 27 further comprising:
  computer code for detecting a change in the operating mode of the gateway device from a non-active operating mode to the active operating mode; and
  computer code for the gateway device issuing a gratuitous ARP message to any translated addresses handled by the gateway device, wherein the gratuitous ARP message includes a Media Access Control (MAC) address of the gateway device.

34. The computer program product of claim 27 wherein the gateway device uses Hot Standby Router Protocol (HSRP) to provide redundancy gateway services;
  further wherein the active operating mode of the gateway device is the HSRP Active state.

35. The computer program product of claim 27 wherein the gateway device uses Virtual Router Redundancy Protocol (VRRP) to provide redundancy gateway services.

36. The computer program product of claim 27 wherein the gateway device is a router.

37. A method of simultaneously providing HSRP gateway services and Network Address Translation (NAT) services using a gateway device in a redundancy group, wherein the gateway device handles transmissions into and out of a first network only when the gateway device operates in the HSRP Active state, the method comprising:
  implementing a NAT functionality in the gateway device, wherein the NAT functionality comprises an Address Resolution Protocol (ARP) functionality, implementing the NAT functionality comprising:
    installing Internet Protocol (IP) aliases in the gateway device;
    installing NAT mappings in the gateway device for hosts on the first network, wherein the NAT mappings map private IP addresses to global IP addresses; and
    enabling the ARP functionality; and
    disabling the ARP functionality when the gateway device is not in the active operating mode;
  wherein the ARP functionality comprises:
    replying to ARP requests from external hosts for NAT translated addresses of hosts on the first network by composing ARP replies and sending the ARP replies, wherein the external hosts are not on the first network and wherein the gateway device is not one of the hosts on the first network; and
    installing ARP entries for translated addresses.

38. The method of claim 37 further comprising:
  detecting a change in the operating mode of the gateway device from the active operating mode to a non-active operating mode;
  removing any ARP entries in the gateway device.

39. The method of claim 37 further comprising:
  detecting a change in the operating mode of the gateway device from a non-active operating mode to the active operating mode;
  installing ARP entries in the gateway device.

40. The method of claim 37 further comprising:
  detecting a change in the operating mode of the gateway device from a non-active operating mode to the active operating mode;
  the gateway device issuing a gratuitous ARP message to any translated addresses handled by the gateway device, wherein the gratuitous ARP message includes a Media Access Control (MAC) address of the gateway device.

41. The method of claim 37 wherein the gateway device is a router.

42. A router comprising:
a memory; and
a processor coupled to the memory;
wherein the memory and the processor are configured to operate the router as an Active router in a Hot Standby Router Protocol (HSRP) redundancy group under preselected conditions;
further wherein the router provides Network Address Translation (NAT) services comprising:
replying to Address Resolution Protocol (ARP) requests only when the router is the Active router in the HSRP redundancy group;
creating and maintaining Network Address Translation (NAT) mappings for hosts on a first network, irrespective of the HSRP state of the router, wherein the NAT mappings map private Internet Protocol (IP) addresses to global IP addresses;
creating and maintaining ARP entries only when the router is the Active router in the HSRP redundancy group, and
responding to ARP requests from external hosts for NAT translated addresses of the hosts on the first network by composing ARP replies and sending the ARP replies, wherein the external hosts are not on the first network and wherein the gateway device is not one of the hosts on the first network.

43. The router of claim 42 wherein the memory and the processor are configured to remove any ARP entries in the router when the router ceases to be the Active HSRP router.

44. The router of claim 42 wherein the memory and the processor are configured to install ARP entries when the router changes state from Standby to Active HSRP router; and
further wherein the memory and the processor are configured to issue a gratuitous ARP message to any translated addresses handled by the router when the router changes state from the Standby HSRP router to the Active HSRP router, wherein the gratuitous ARP message includes a Media Access Control (MAC) address of the router.

45. The router as recited in claim 42, wherein the memory and the processor are further configured to respond to ARP requests with an ARP reply including a Media Access Control (MAC) address of the router.

* * * * *